(12) United States Patent
Lefebvre et al.

(10) Patent No.: US 7,733,350 B2
(45) Date of Patent: Jun. 8, 2010

(54) ANISOMETRIC TEXTURE SYNTHESIS

(75) Inventors: Sylvain Lefebvre, La Fouillouse (FR); Hugues H. Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 11/428,311

(22) Filed: Jun. 30, 2006

(65) Prior Publication Data

US 2008/0001962 A1    Jan. 3, 2008

(51) Int. Cl.
G09G 5/00 (2006.01)

(52) U.S. Cl. .................. 345/582; 345/585; 345/586

(58) Field of Classification Search .......... 345/582–588
See application file for complete search history.

(56) References Cited

U.S. PATENT DOCUMENTS

| | | | |
|---|---|---|---|
| 5,097,427 | A | 3/1992 | Lathrop et al. |
| 5,388,517 | A | 2/1995 | Levien |
| 5,459,586 | A | 10/1995 | Nagasato et al. |
| 5,471,572 | A | 11/1995 | Buchner et al. |
| 5,680,528 | A | 10/1997 | Korszun |
| 5,740,277 | A | 4/1998 | Katto |
| 5,774,129 | A | 6/1998 | Poggio et al. |
| 5,784,498 | A | 7/1998 | Venable |
| 5,872,867 | A | 2/1999 | Bergen |
| 5,974,198 | A | 10/1999 | Hamburg et al. |
| 6,075,905 | A | 6/2000 | Bergen et al. |
| 6,185,342 | B1 | 2/2001 | Hamburg et al. |
| 6,392,655 | B1 | 5/2002 | Migdal |
| 6,525,744 | B1 | 2/2003 | Poggio et al. |
| 6,593,933 | B1 | 7/2003 | Xu |

(Continued)

FOREIGN PATENT DOCUMENTS

JP      9044655      2/1997

(Continued)

OTHER PUBLICATIONS

P V Sander, Z J Wood, S J Gortler, J Snyde and H Hoppe, "Multi-Chart Geometry Images," In Proceedings of the Eurographics/ACM SiG-GRAPH Symposium on Geometry Processing, 2003, pp. 146-155.*

(Continued)

*Primary Examiner*—Xiao M Wu
*Assistant Examiner*—Lillian K Ng
(74) *Attorney, Agent, or Firm*—Lyon & Harr, L.L.P.; Craig S. Fischer

(57) ABSTRACT

An anisometric texture synthesis system and method for generating anisometric textures having a similar visual appearance as a given exemplar, but with varying orientation and scale. This variation is achieved by modifying the upsampling and correaction processes of the texture synthesis technique using a Jacobian field. The modified correaction process includes accessing only immediate neighbors of a pixel instead of non-local pixels. This constraint that only immediate neighbors be used also allows the generation of seamless anisometric surface textures. This is achieved by using indireaction maps containing indirection pointers that are used to jump from a set of pixels outside the boundary of a texture atlas chart to another chart. The system and method also includes an anisometric synthesis magnification technique that uses a Jacobian field to modify the magnification step of a synthesis magnification scheme and account for anisometry.

20 Claims, 10 Drawing Sheets

U.S. PATENT DOCUMENTS

| | | | |
|---|---|---|---|
| 6,700,585 B2 | 3/2004 | Ritter | |
| 6,762,769 B2 | 7/2004 | Guo et al. | |
| 6,888,544 B2 | 5/2005 | Malzbender et al. | |
| 6,965,694 B2 | 11/2005 | Ueda et al. | |
| 6,999,095 B2 | 2/2006 | Wang et al. | |
| 7,002,591 B1 | 2/2006 | Leather et al. | |
| 7,034,841 B1 | 4/2006 | Weiblen et al. | |
| 7,088,375 B1 | 8/2006 | Hamburg | |
| 2002/0070947 A1* | 6/2002 | Dorbie et al. | 345/582 |
| 2002/0122043 A1 | 9/2002 | Freeman | |
| 2002/0158888 A1 | 10/2002 | Kitsutaka | |
| 2002/0171660 A1 | 11/2002 | Luo et al. | |
| 2003/0164838 A1 | 9/2003 | Guo | |
| 2003/0179923 A1 | 9/2003 | Xiong | |
| 2003/0189579 A1 | 10/2003 | Pope | |
| 2003/0206176 A1 | 11/2003 | Ritter | |
| 2004/0075666 A1 | 4/2004 | Ritter | |
| 2004/0096120 A1 | 5/2004 | Tong | |
| 2004/0155887 A1 | 8/2004 | Kitsutaka | |
| 2004/0165787 A1 | 8/2004 | Perez et al. | |
| 2004/0233211 A1 | 11/2004 | Wang | |
| 2004/0234159 A1 | 11/2004 | Wang | |
| 2005/0007378 A1 | 1/2005 | Grove | |
| 2005/0013509 A1 | 1/2005 | Samadani | |
| 2005/0231519 A1 | 10/2005 | Solanki et al. | |
| 2005/0253863 A1 | 11/2005 | Mitchell et al. | |
| 2006/0001679 A1 | 1/2006 | Hamburg | |
| 2006/0028481 A1 | 2/2006 | Zhang et al. | |

FOREIGN PATENT DOCUMENTS

| | | |
|---|---|---|
| WO | WO2004055724 | 7/2004 |

OTHER PUBLICATIONS

W T Freeman, E C Pasztor and O T Carmichael, "Learning Low-Level Vision" 2000. International Journal of Computer Vision 40(1), pp. 25-47.*

Abstract JP9044655.

Adelson, E. H., C. H. Anderson, J. R. Bergen, P. J. Burt and J. M. Ogden, Pyramid methods in image processing, RCA Engineer, Nov./Dec. 1984, pp. 33-41, vol. 29, No. 6.

Ashikhmin, M., Synthesizing Natural Textures, Proceedings of 2001 ACM Symposium on Interactive 3D Graphics, Research Triangle Park, North Carolina Mar. 19-21, pp. 217-226.

Bar-Joseph, Z., R. El-Yaniv, D. Lischinski, and M. Werman, Texture mixing and texture movie synthesis using statistical learning, IEEE TVCG, 2001, vol. 7 No. 2, pp. 120-135.

Burt, P. J., E. Adelson, The Laplacian Pyramid as a compact image code, IEEE Transactions on Communications, Apr. 1983, vol. com-31 No. 4, pp. 532-540.

Cohen, M., J. Shade, S. Hiller, and O. Deussen, 2003, Wang tiles for image and texture generation, ACM SIGGRAPH, pp. 287-294.

Cula, O.G. and K. J. Dana, Recognition Methods for 3D Textured Surfaces, available at http://www.ece.rutgers.edu/~kdana/research/spie01.pdf.

De Bonet, J., Multiresolution sampling procedure for analysis and synthesis of texture images, ACM SIGGRAPH, pp. 341-346.

Efros, A., and T. Leung, Texture synthesis by non-parametric sampling, ICCV, 1999, pp. 1033-1038.

Fatahalian, K., Real-Time Global Illumination of Deformable Objects, available at: http://graphics.stanford.edu/~kayvonf/papers/seniorthesis03.pdf.

Garber, D., Computational Models for Texture Analysis and Texture Synthesis. PhD thesis, University of Southern California, 1981.

Gralewski, L., N. Campbell, Statistical synthesis of facial expressions for the portrayal of emotion available at http://delivery.acm.org/10.1145/990000/988867/p190-gralewski.pdf?key1=988867&key2=9951194411&coll= GUIDE&dl=GUIDE&CFID=69372413& CFTOKEN=85977336.

Hertzmann, A., C. Jacobs, N. Oliver, B. Curless and D. Salesin, Image analogies, ACM SIGGRAPH, 2001, pp. 327-340.

Hertzmann, A., and D. Zorin, Illustrating smooth surfaces, ACM SIGGRAPH, 2000, pp. 517-526.

Kwatra, V., I. Essa, A. Bobick, and N. Kwatra, Texture optimization for example-based synthesis, ACM SIGGRAPH, 2005, pp. 795-802.

Kwatra, V., A. Schödl, I. Essa, G. Turk, and A. Bobick, Graphcut textures: image and video synthesis using graph cuts, in ACM SIGGRAPH, 2003, pp. 277-286.

Lai, Y.-K., S.-M. Hu, D. Gu, and R. Martin, Geometric texture synthesis and transfer via geometry images, Proc. of SMA, 2005, pp. 15-26.

Lefebvre, S., and H. Hoppe, Parallel controllable texture synthesis, ACM SIGGRAPH, 2005, pp. 777-786.

Lefebvre, S., and F. Neyret, Pattern based procedural textures, Symposium and Interactive 3D Graphics, 2003, pp. 203-212.

Leung, T., and Malik, J., Representing and recognizing the visual appearance of materials using three-dimensional textons, IJCV, vol. 43, No. 1, 2001, pp. 29-44.

Liang, L., C. Liu, Y. Xu, B. Guo, and H.-Y. Shum, Real-time texture synthesis by patch-based sampling, 2001, ACM TOG, vol. 20, No. 3, 127-150.

Liu, Y., W.-C. Lin, and J. Hays, Near-regular texture analysis and manipulation, ACM SIGGRAPH, 2004, pp. 368-376.

Liu, Y., Y. Tsin, and W.-C. Lin, The promise and peril of near-regular texture, IJCV, vol. 62, No. 1-2, pp. 149-159.

Magda, S., and D. Kriegman, Fast texture synthesis on arbitrary meshes, Eurographics Symposium on Rendering, 2003, pp. 82-89.

Malik, J., S. Belongie, J. Shi, and T. Leung, Textons, contours and regions: Cue integration in image segmentation, ICCV, 1999, pp. 918-925.

Neyret, F., and M.-P. Cani, Pattern-based texturing revisited, ACM SIGGRAPH, 1999, pp. 235-242.

Neyret, F., Advected textures, Symposium on computer animation, 2003, pp. 147-153.

Popat, K., and Picard, R., Novel cluster-based probability model for texture synthesis, classification, and compression, Visual Communications and Image Processing, 1993, pp. 756-768.

Praun, E., A. Finkelstein, and H. Hoppe, Lapped textures, ACM SIGGRAPH, 2000, pp. 465-470.

Roweis, S., EM algorithms for PCA and SPCA, NIPS, 1997, pp. 626-632.

Roweis, S., and L. Saul, Nonlinear dimensionality reduction by locally linear embedding, Science, 2000, vol. 290, pp. 2323-2326.

Sloan, P.-P., Liu, X., , H.-Y. Shum and J. Snyder, Bi-scale radiance transfer, ACM SIGGRAPH, 2003, pp. 370-375.

Soler, C., M.-P. Cani, and A. Angelidis, Hierarchical pattern mapping, ACM SIGGRAPH, 2002, pp. 673-680.

Tanner, C., C. Migdal, and M. Jones, The clipmap: A virtual mipmap, ACM SIGGRAPH, 1998, pp. 151-158.

Tenenbaum, J., V. de Silva, and J. Langford, A global geometric framework for nonlinear dimensionality reduction, Science, 2000, vol. 290, pp. 2319-2323.

Tong, X., J. Zhang, L. Liu, X. Wang, B. Guo and H.-Y. Shum, Synthesis of bidirectional texture functions on arbitrary surfaces, 2002, ACM SIGGRAPH, pp. 665-672.

Tonietto, L., and M. Walter, Towards local control for image-based texture synthesis, Proceedings of the 15th Brazilian Symposium on Comp. Graphics and Image Processing SIBGRAPHI, 2002, pp. 252-258.

Turk, G., Texture synthesis on surfaces, ACM SIGGRAPH, 2001, pp. 347-354.

Turk, G., Generating textures on arbitrary surfaces using reaction-diffusion, Proceedings of the 18th Annual Conf. on Comp. Graphics and Interactive Techniques, 1991, pp. 289-298.

Wang, L., X. Gu, K. Mueller and S.-T. Yau, Uniform texture synthesis and texture mapping using global parameterization, J. The Visual Comp., pp. 801-810.

Wei, L.-Y. and M. Levoy, Fast texture synthesis using tree-structured vector quantization, ACM SIGGRAPH, 2000, pp. 479-488.

Wei, L.-Y., and M. Levoy, Texture synthesis over arbitrary manifold surfaces, ACM SIGGRAPH, 2001, pp. 355-360.

Wei, L.-Y. and M. Levoy, Order-independent texture synthesis, http://graphics.stanford.edu/papers/texture-synthesis-sig03/, Rejected from SIGGRAPH 2003.

Wei, L.-Y., Tile-based texture mapping on graphics hardware, Graphics Hardware, 2004, pp. 55-64.

Wu, Q., and Y. Yu, Feature matching and deformation for texture synthesis, ACM SIGGRAPH, 2004, pp. 362-365.

Ying, L., A. Hertzmann, H. Biermann, and D. Zorin, Texture and shape synthesis on surfaces, Eurographics Workshop on Rendering, 2001, pp. 301-312.

Zalesny, A., V. Ferrari, G. Caenen, and L. Van Gool, Composite texture synthesis, IJCV, 2005, vol. 62, No. 1-2, pp. 161-176.

Zhang, J., K. Zhou, L. Velho, B. Guo, and H.-Y. Shum, Synthesis of progressively-variant textures on arbitrary surfaces, 2003, ACM SIGGRAPH, pp. 295-302.

Co-pending U.S. Appl. No. 11/172,594, Sub-pass correction using neighborhood matching, filed Jun. 30, 2005.

Co-pending U.S. Appl. No. 11/171,920, Multi-level image stack of filtered images, filed Jun. 30, 2005.

Co-pending U.S. Appl. No. 11/171,923, Magnification of indirection textures, filed Jun. 30, 2005.

Co-pending U.S. Appl. No. 11/174,231, Parallel texture synthesis by unsampling pixel coordinates, filed Jun. 30, 2005.

Co-pending U.S. Appl. No. 11/172,593, Parallel texture synthesis having controllable jitter, filed Jun. 30, 2005.

Co-pending U.S. Appl. No. 11/426,564 Texture synthesis using dimensionality-reduced appearance space, filed Jun. 26, 2006.

Co-pending U.S. Appl. No. 11/428,355, Synthesis of advecting texture using adaptive regeneration, filed Jun. 30, 2006.

Aaron M. Guertin, Office Action, U.S. Appl. No. 11/172,593, Mailed Sep. 13, 2007.

Aaron M. Guertin, Office Action, U.S. Appl. No. 11/172,594, Mailed Oct. 15, 2007.

Stephen R. Koziol, Office Action, U.S. Appl. No. 11/171,920, Mailed Sep. 19, 2007.

Wesner Sajous, Office Action, U.S. Appl. No. 11/171,923, Mailed Aug. 24, 2007.

* cited by examiner

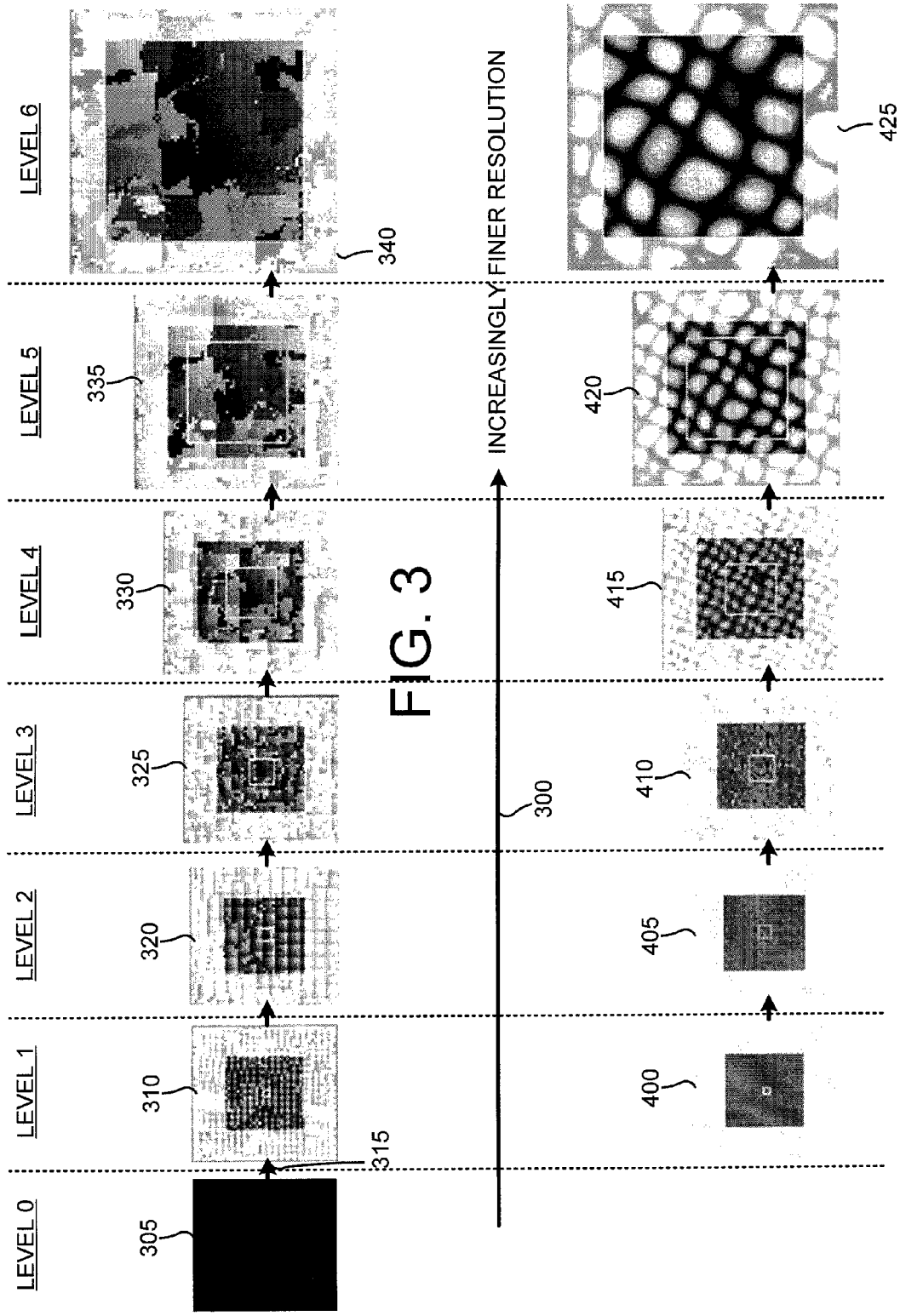

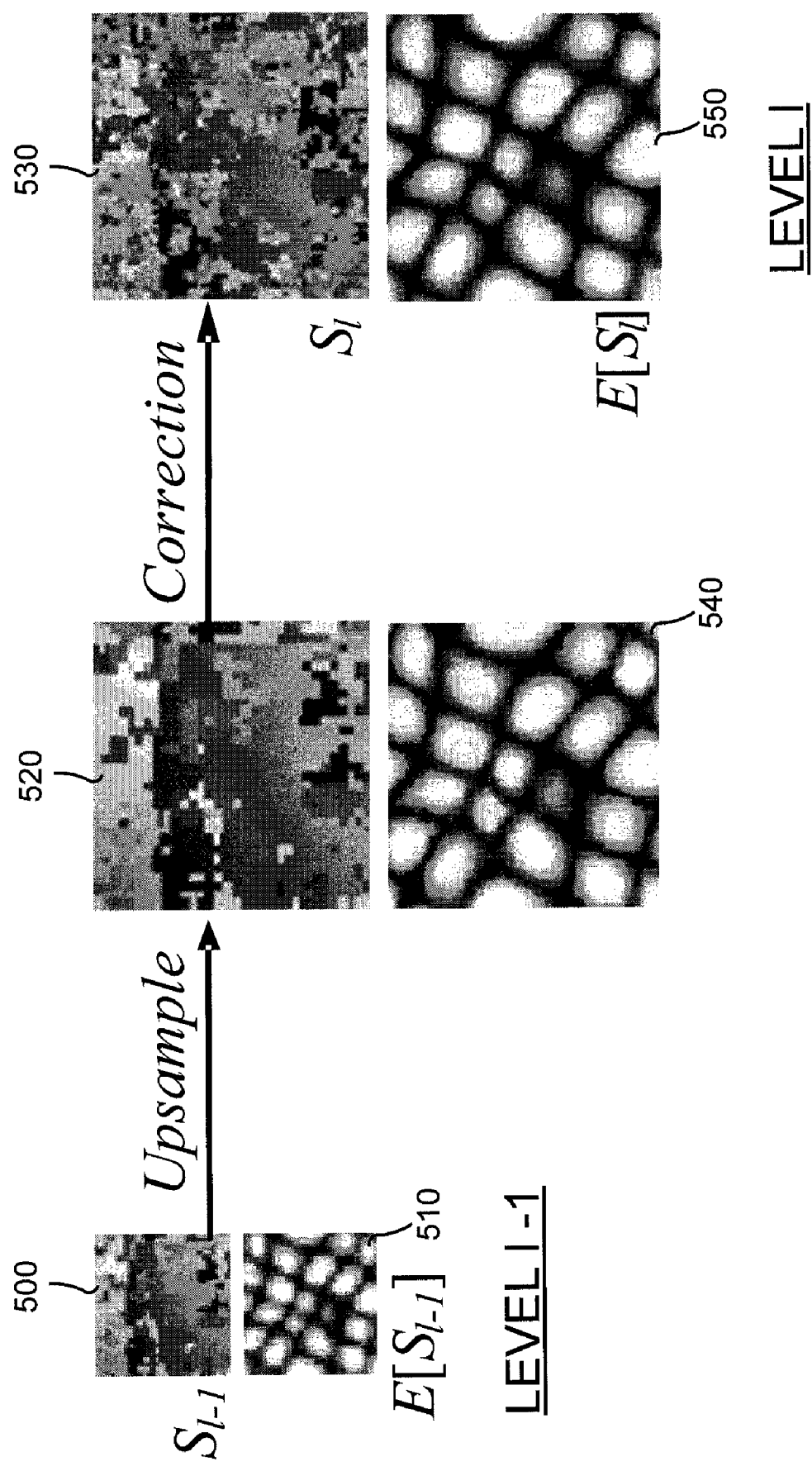

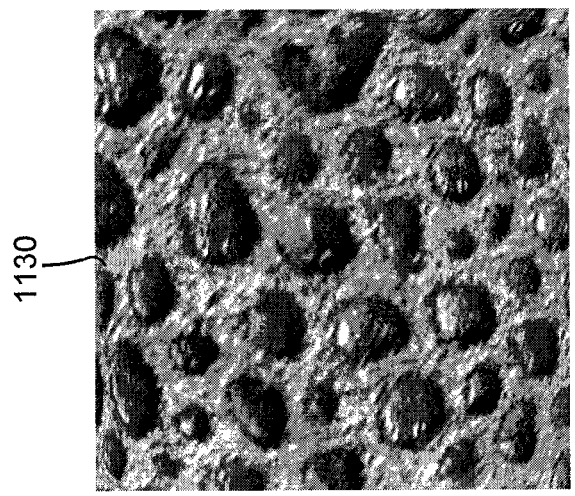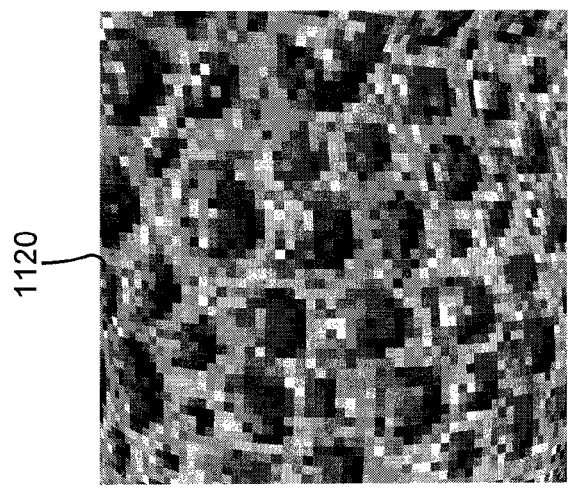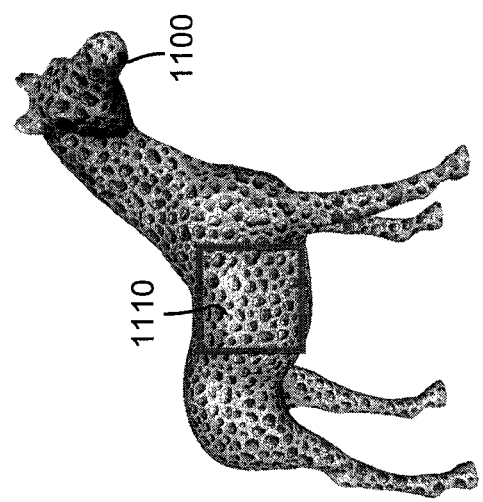
FIG. 11

ANISOMETRIC TEXTURE SYNTHESIS

BACKGROUND

Texture synthesis involves automatically generating large textures from a small example image (known as a texture sample or exemplar). This exemplar-based texture synthesis takes an exemplar and generates additional content based on that exemplar to create much more content than is contained in the exemplar. Exemplar-based texture synthesis alleviates the need to store explicitly an entire expanse of content. Instead, the content is generated "on the fly" from the much smaller exemplar.

Traditionally, exemplar-based texture synthesis includes a correaction process that compares neighborhoods of each synthesized pixel with neighborhoods of the exemplar. The synthesized pixels then are modified to recreate synthesized neighborhoods that are compatible with the exemplar content. For each pixel, the best matching neighborhood is found, and then the current pixel is replaced with the best-matching pixel. The best-matching neighborhood is determined by comparing pixel colors in a small grid of pixels. For example, for each pixel, a 5×5 neighborhood of pixels may be examined, and the error of the neighborhood is the sum of the errors of the red, green, and blue (RGB) color vectors of individual pixels in the 5×5 neighborhood.

Texture synthesis can be isometric or anisometric (meaning "not isometric"). Isometric texture synthesis generates texture having the same pattern at the same scale and at the same orientation. On the other hand, anisometric texture synthesis allows variation in the orientation and local scaling of features in a generated texture.

During the correaction process, a neighborhood is gathered in the currently synthesized texture and compared with neighborhoods from the exemplar. In order to perform anisometric synthesis, current techniques deform the gathered neighborhood. An inverse Jacobian is the transformation applied to a neighbor's coordinates before fetching their color. The inverse Jacobian is a 2×2 matrix that transforms the pixel neighborhood using an affine transformation. In particular, given a Jacobian field, a pixel neighborhood is transformed by the inverse Jacobian. In order to compensate for the inverse Jacobian, the orientation and scale of the pixel neighborhood is changed. This means that rather than retrieving colors at the original points of the neighborhood, colors are retrieved at a new set of transformed neighborhood points, due to the new orientation and scaling.

There are several drawbacks to these current anisometric texture synthesis techniques. The first drawback is lack of memory coherency. In particular, in some situations the transformed neighborhood becomes large and spread out. This means that pixels a great distance away may be accessed instead of immediate pixel neighbors. This leads to more random memory accesses, which can cause inefficiency and lack of coherency in the memory access.

A second drawback is the need to resample non-local pixels that are accessed during the correaction process. Specifically, after transformation the pixels have to be resampled by some process that interpolates their values. This is necessary because the transformed pixels are spread out over large area. However, this resampling process is inefficient and can cause visible blurring in the synthesized texture.

A third drawback is lack of texture coherence. Because the samples are widely spaced apart, the correaction process no longer depends on the values of adjacent pixels. This can drastically decrease texture coherency. This incoherency can make the correaction process behave poorly and ineffectively, and can even cause the process to fail to converge.

Another current anisometric texture synthesis technique is to represent several versions of the exemplar under a variety of rotations and scales, and to select among these exemplar versions based on the desired Jacobian at the current pixel. However, this approach requires significant memory usage to store and analyze the many exemplar versions. Moreover, texture coherency is also difficult to achieve.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The anisometric texture synthesis system and method disclosed herein includes several techniques that allow the generation of high-quality anisometric texture with a high efficiency and a minimum of overhead. In general, the anisometric texture synthesis system and method synthesizes new textures with the same visual appearance as a given sample image or exemplar, but having a different orientation and scale. This orientation and scale are dictated by a Jacobian field. A Jacobian is a 2×2 matrix that represents a linear transformation at a point. The anisometric texture synthesis system and method can be used to generate synthesized texture in the plane and on a surface.

The anisometric texture synthesis system and method includes using a synthesis scheme whereby only immediate neighbors of a pixel are accessed. Using only immediate neighbors improves both memory and texture coherence. In addition, the need to resample non-local pixels that are accessed during the correaction process is mitigated. It is assumed that the underlying synthesis process relies on exemplar pixel coordinates rather than colors. Thus, the synthesized texture does not directly contain colors, but instead contains the coordinates where the color of the pixels must be fetched in the exemplar. Many texture synthesis schemes have this approach.

In this setting, each immediate neighbor of a given pixel has a coordinate within the exemplar. Each neighbor is used to predict a replacement candidate for the current pixel. Instead of applying the anisometric transformation before accessing the neighbors, the anisometric texture synthesis system and method accesses the immediate neighbors and later applies the transformation to the exemplar coordinates retrieved from the immediate neighbors to predict a good replacement candidate for the current pixel. Thus, only immediate neighbors are accessed, but the transformation is equivalently applied during the correaction process.

The goal is that given a pixel p, a neighborhood of texture is built up around p in order to compare it to other neighborhoods of the exemplar using a best-matching correaction process. The immediate neighbors are obtained by using a direction component. Once a synthesized coordinate is retrieved at an immediate neighbor, an offset is applied to retrieve what the method predicts the synthesized coordinate should be at the pixel itself.

The fact that the synthesis scheme uses only immediate neighbors also allows the generation of seamless anisometric surface textures. In particular, given a surface that is described as a triangle mesh, and a parameterization of this surface over a texture domain, the parameterization partitions the mesh surface into charts and maps each of the charts into a region of the texture domain. The goal is to synthesize texture in the texture domain such that the resulting textured surface has a user-specified appearance. More precisely, the texture on the surface should align (in terms of both rotation and scale) with a user-provided Jacobian field over the surface. Part of the difficulty is that the mesh parameterization has broken the surface into disjoint charts, and that it is desirable for the surface texture to look seamless across these chart boundaries. In order to form this seamless texture, the synthesis neighborhoods for pixels near chart boundaries must include samples from other charts. To accommodate this requirement, the anisometric texture synthesis method uses indireaction pointers that provide the ability to jump from one atlas chart boundary to another texture atlas chart.

For a small set of pixels outside the boundary of each chart, indireaction pointers are used to point to other pixels that are interior to another chart. There a little extra space (or gutter) around each chart, so that these indireaction pointers can be followed to retrieve the colors. This ability to form seamless surface textures directly exploits the feature that the anisometric correaction scheme accesses a neighborhood of fixed extent.

The anisometric texture synthesis system and method also includes an anisometric synthesis magnification technique. Synthesis magnification involves using synthesized coordinates to obtain a higher-resolution version of the same exemplar. Synthesis magnification can be used to hide sampling nonuniformities, such as parameterization distortion. The anisometric texture synthesis method modifies a synthesis magnification scheme to include a Jacobian field. This Jacobian is used to modify the magnification step of the synthesis magnification scheme and account for anisometry.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 3 illustrates an example of the progression of index maps (an index map is an image of synthesized texture coordinates) for progressively finer resolution levels for a special case of the anisometric texture synthesis method shown in FIG. 2.

FIG. 4 illustrates the corresponding texture images (or synthesized color images) of the index maps shown in FIG. 3.

FIG. 5 is a block diagram illustrating an example of the special case of anisometric texture synthesis process shown in FIGS. 3 and 4.

FIG. 11 illustrates an example of the anisometric synthesis magnification scheme.

DETAILED DESCRIPTION

In the following description of the anisometric texture synthesis method and system, reference is made to the accompanying drawings, which form a part thereof, and in which is shown by way of illustration a specific example whereby the anisometric texture synthesis method and system may be practiced. It is to be understood that other embodiments may be utilized and structural changes may be made without departing from the scope of the claimed subject matter.

I. System Overview

The anisometric texture synthesis system and method can be used to generate synthesized texture in two dimensions (2-D) on a plane or on a surface. In general, the anisometric texture synthesis system and method create new textures with the same visual appearance as a given sample image or exemplar, albeit having a different orientation and scale as specified by a Jacobian field. The anisometric texture synthesis system and method described herein allows simple, efficient and high-quality anisometric synthesis of texture in 2-D, both on the plane or on surfaces.

Figure 1:
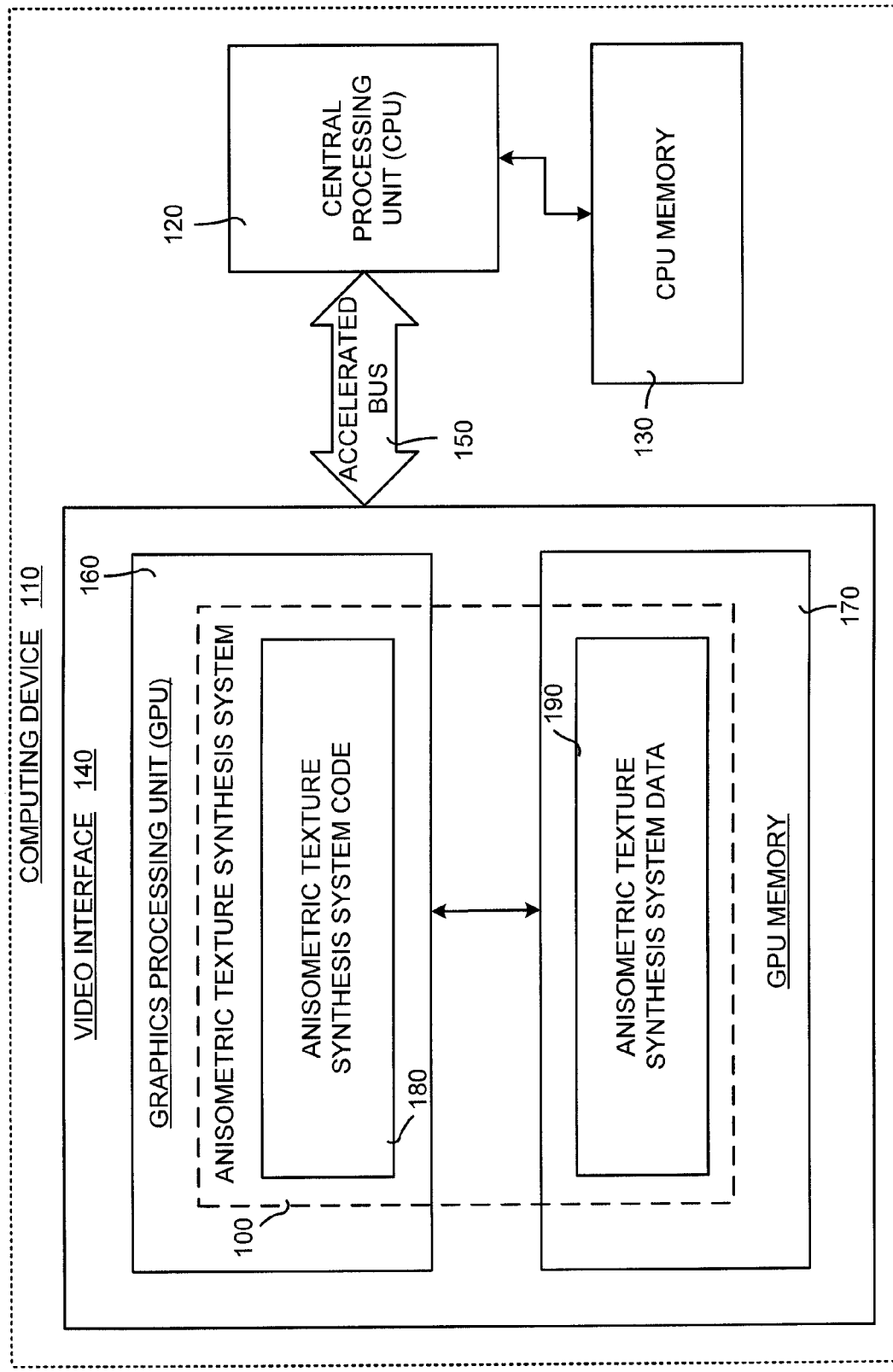
FIG. 1 is a block diagram illustrating an exemplary implementation of the anisometric texture synthesis system disclosed herein.

FIG. 1 is a block diagram illustrating an exemplary implementation of the anisometric texture synthesis system disclosed herein. It should be noted that FIG. 1 is merely one of several ways in which the anisometric texture synthesis system may implemented and used. The anisometric texture synthesis system may also be implemented on other types of processing systems, such as on a central processing unit (CPU) or multi-core processing systems.

Referring to FIG. 1, the anisometric texture synthesis system 100 is designed to run on a computing device 110 (shown by a dotted line). It should be noted that the anisometric texture synthesis system 100 may be run on numerous types of general purpose or special purpose computing system environments or configurations, including personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The computing device 110 shown in FIG. 1 is merely meant to represent any one of these and other types of computing system environments or configurations.

As shown in FIG. 1, the computing device 110 contains a central processing unit (CPU) 120 and a CPU memory 130. The CPU 120 is in communication with a video interface 140 through an accelerated bus 150. By way of example and not limitation, this bus 150 may be an Accelerated Graphics Port (AGP) or a PCI Express, which are designed especially for the throughput demand of 3-D graphics.

The video interface 140 includes a graphics processing unit (GPU) 160 and a GPU memory 170. The GPU 160 is designed to accelerate real-time 3-D graphics display. The GPU 160 is capable of transferring data to the CPU 120 over the bus 150. The anisometric texture synthesis system 100 is also in communication with the GPU 160 and the GPU memory 170. The anisometric texture synthesis system 100 is shown in FIG. 1 by the dashed lines. In the implementation shown in FIG. 1, the system 100 includes anisometric texture synthesis system code 180 residing on the GPU 160, and anisometric texture synthesis data 190 residing in the GPU memory 170.

II. Operational Overview

Figure 2:
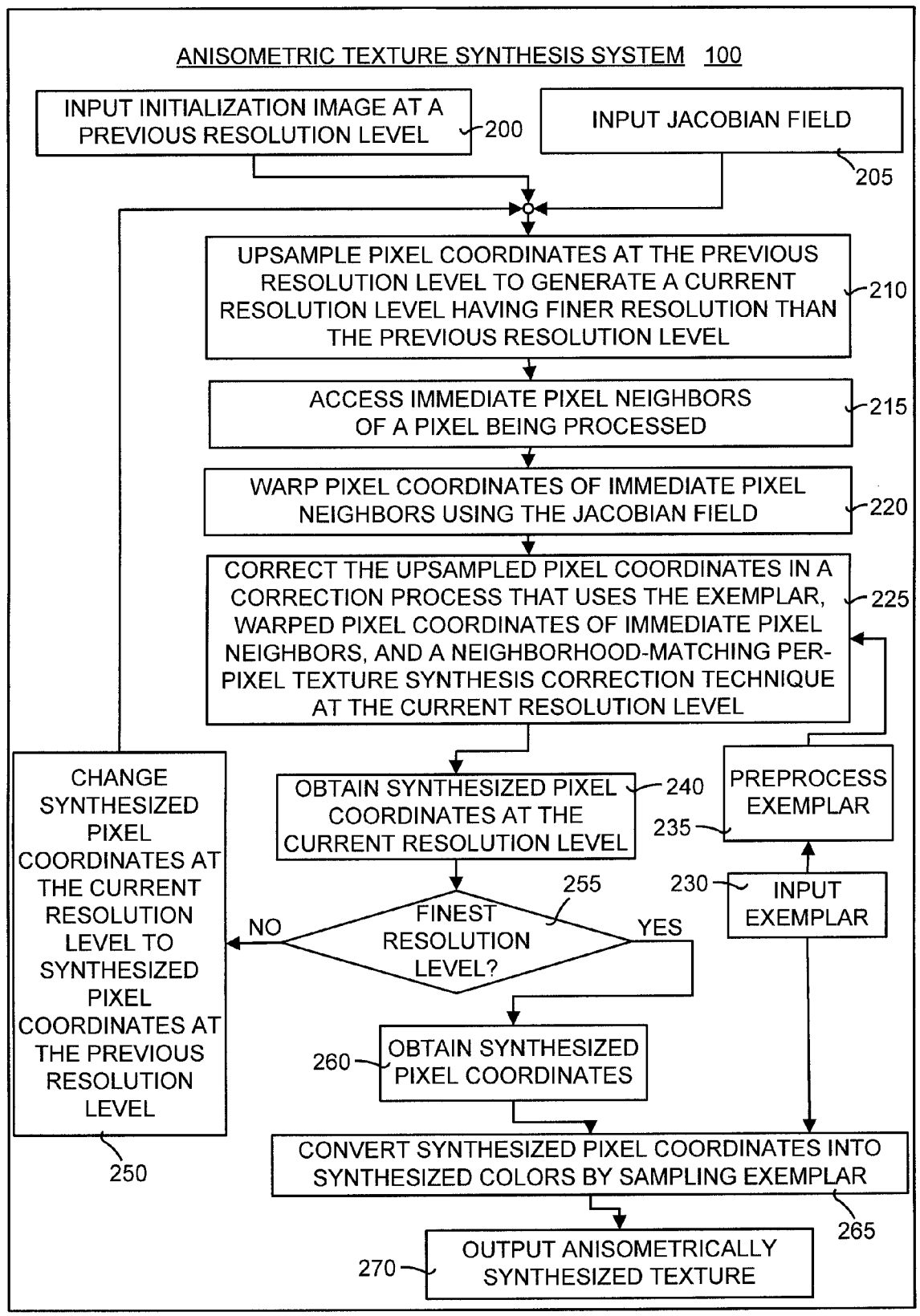
FIG. 2 is a flow diagram illustrating the general operation of the anisometric texture synthesis system shown in FIG. 1.

FIG. 2 is a flow diagram illustrating the general operation of the anisometric texture synthesis system 100 shown in FIG. 1. In general, the anisometric texture synthesis method uses immediate pixel neighbors and a Jacobian field to generate anisometric synthesized textures from an exemplar image. The anisometric texture synthesis method can be used to generate 2-D textures both on a plane and on a surface.

More specifically, the anisometric texture synthesis method is initialized by inputting an initialization image (box 200). This initialization image contains synthesis coordinates. It is the synthesis result of a previous resolution level, or the coarsest level of the multi-resolution approach, which typically only contains zeros. The initialization image is at a previous resolution level, or the coarsest resolution level of the multi-resolution approach.

A Jacobian field also is input (box 205). A Jacobian field can be used to change orientation and scale of an image. The Jacobian, which typically is represented by the notation, J, is a 2×2 matrix containing two vectors. These two vectors dictate how the vectors of the input texture should be mapped into the image. The Jacobian field records derivative information about how the original domain (which in this case is the texture) should be defined as it is created over the image.

The iteration process begins by upsampling pixel coordinates of the image at the previous resolution level (box 210). In the first iteration, the upsampled image is the initialization image. At subsequent iterations the image to be upsampled is the output of the previous iteration. The upsampling generates a current resolution level having a finer resolution level than the previous resolution level. In other words, in the coarse-to-fine pyramid used in the multi-resolution approach, the resolution levels become progressively finer with successive iterations.

A pixel then is selected for processing, and the immediate neighbors of the pixel being processed are accessed (box 215). Next, the synthesized pixel coordinates stored in the immediate pixel neighbors are warped using the Jacobian field (box 220). The warping means that the orientation and scale are changed as specified by the Jacobian field.

Once the warped coordinates of the immediate neighbors have been used to predict a set of candidates for the current pixel, a new neighborhood is built and a standard texture synthesis correaction process is applied (box 225). An exemplar is input for this correaction process (box 230). This correaction process involves comparing the neighborhoods of the candidates with the neighborhood computed for the current pixel. Note that all these neighborhoods are in undistorted exemplar space.

The output of each iteration is a synthesized image whose pixels contain exemplar pixel coordinates at the current resolution level (box 240). A determination then is made as to whether the current resolution is the finest (and thus final) resolution level (box 255). If the current resolution level is not the finest resolution level, then another iteration is performed. In this case, the current resolution level becomes the previous resolution level. This means that the synthesized pixel coordinates at the current resolution level are now designated as the synthesized pixel coordinates at the previous resolution level (box 250). The iteration then proceeds as discussed above until the finest resolution level is reached (box 255).

If the current resolution level is the finest resolution level, then the synthesized pixel coordinates are obtained (box 260). These synthesized pixel coordinates may be processed by other applications, or a corresponding anisometric synthesized texture may be generated. In order to generate such an anisometric synthesized texture, first the synthesized pixel coordinates are converted into synthesized colors by sampling the exemplar (box 265). Finally, from this conversion process, the anisometrically synthesized texture is the resultant output (box 270).

III. Operational Details

The details of the anisometric texture synthesis method will now be discussed. FIG. 3 illustrates an example of the progression of index maps for progressively finer resolution levels of a special case of the anisometric texture synthesis method shown in FIG. 2. It should be noted that an index map is an image of synthesized texture coordinates. In particular, FIG. 3 is a special case of anisometric texture synthesis, where the Jacobian is everywhere equal to the identity 2×2 matrix. An index map is an image whose pixel values contain coordinates referring back to the exemplar image domain. These coordinates can be visualized as colors. For instance, coordinates (0,0) as black, coordinates (1,0) as red, coordinates (0,1) as green, coordinates (1,1) as yellow, and interpolated colors everywhere in between. An index map is a pixel location color map that uses color to indicate a location of a pixel color in the exemplar. In addition, FIG. 3 illustrates the resolution levels for an exemplary implementation having six resolution levels. As shown by the long arrow 300, increasingly higher resolution levels indicate increasingly finer resolution.

As shown FIG. 3, the anisometric texture synthesis method begins by using an image containing zeros (an all black image) 305 at resolution level 0. The iterative process of FIG. 2 is performed, and the resultant first index map 310 is at resolution level 1. It should be noted that each small arrow between the index maps indicates one iterative process as described in FIG. 2. For example, the small arrow 315 between the image containing zeros 305 and the first index map 310 indicates that one iterative process of the anisometric texture synthesis method has been performed.

At progressively finer resolution levels, the iteration process is repeated to produce additional resolution levels and index maps. Specifically, an iteration is performed at level 1 to produce a second index map 320 at level 2, another iteration is performed at level 2 to produce a third index map 325 at level 3, and another iteration is performed at level 3 to produce a fourth index map 330 at level 4. A fifth index map 335 at level 5 and a sixth index map 340 at level 6 are generated in the same manner.

FIG. 4 illustrates the corresponding texture images (or synthesized color images) of the index maps shown in FIG. 3. The texture image colors are obtained by accessing the exemplar colors at the coordinates specified in the synthesized index map. A first texture image 400 corresponds to the first index map 310. Similarly, a second texture image 405 corresponds to the second index map 320, a third texture image 410 corresponds to the third index map 325, a fourth texture image 415 corresponds to the fourth index map 330, a fifth texture image 420 corresponds to the fifth index map 335, and a sixth texture image 425 (or a final synthesized texture) corresponds to the sixth index map 340.

FIG. 5 is a block diagram illustrating an example of the anisometric texture synthesis process shown in FIGS. 2, 3 and 4, going from a previous resolution level (Level l–1) to a current resolution level (Level l) of the multi-resolution approach. FIG. 5 illustrates the two main processes used at each level (and in each iteration) of the multi-resolution approach. For example, referring to FIG. 3, FIG. 5 illustrates what occurs when going from the first index map 310 to the second index map 320.

A first index map 500 is shown mathematically by the term $S_{l-1}$, where $S_{l-1}$ is a synthesized coordinate output at a resolution Level l–1 (or a previous resolution level). An exemplar 510 is shown mathematically by the term $E[S_{l-1}]$, where $E[S_{l-1}]$ is the exemplar 510 as a function of the first index map 500 at resolution Level l–1. The synthesis output is the indices, and the term $E[S_{l-1}]$ represents looking up the color in the exemplar, E, given the coordinates S. Thus, the synthesis process produces the index maps, and they correspond to the colors, $E[S_{l-1}]$. In other words, S are the synthesized index maps, and $E[S_{l-1}]$ is the colors corresponding to those indices.

As in shown in FIG. 5, at each resolution level the pixel coordinates represented by the first index map 500 are upsampled to produce a second index map 520 representing the upsampled pixel coordinates. This upsampling changes the resolution level from Level l–1 (the previous resolution level) to Level l (a current resolution level). Next, the upsampled coordinates are corrected to produce a third index map 530 representing the corrected pixel coordinates at resolution Level l.

Texture images corresponding to the index maps also are shown in FIG. 5. Specifically, a first texture map 540 corresponds to the second index map 520, and a second texture map 550 corresponds to the third index map 530. The index maps are represented mathematically by the term $S_l$, and each texture images is represented as a function of its corresponding index map, namely, as $E[S_l]$.

Anisometric Synthesis Correaction Process

In this section, the further details of the anisometric texture synthesis method are discussed. As noted above, a Jacobian field is used to allow local rotation and scaling of the texture according to a Jacobian field, J. The Jacobian field is used to modify both the upsampling and correaction processes of the anisometric texture synthesis method.

Rather than defining multiple versions of the exemplar texture under different deformations, as is done by other techniques, the anisometric texture synthesis method anisometrically warps the synthesized neighborhood $N_S$ prior to neighborhood matching. In other words, the synthesized neighborhood is rotated and scaled accordingly to the Jacobian field.

In addition, as explained below, only immediate neighbors of a pixel are used, thereby improving texture and memory coherency. The underlying synthesis process relies on exemplar pixel coordinates rather than colors. This means that the synthesized texture does not directly contain colors, but instead contains the coordinates where the color of the pixels must be fetched in the exemplar. Each immediate neighbor of a given pixel has a coordinate within the exemplar. Each neighbor is used to predict a replacement candidate for the current pixel. Instead of applying the anisometric transformation before accessing the neighbors, the anisometric texture synthesis system and method accesses the immediate neighbors and later applies the transformation to predict a good replacement candidate for the current pixel. Thus, only immediate neighbors are accessed, but the transformation is equivalently applied during the correaction process.

The goal is that given a pixel p, a neighborhood of texture is built up around p in order to compare it to other neighborhoods of the exemplar using a best-matching correaction process. The immediate neighbors are obtained by using a direction component. Once a synthesized coordinate is retrieved at an immediate neighbor, an offset is applied to retrieve what the method predicts the synthesized coordinate should be at the pixel itself.

In isometric texture synthesis, this neighborhood is built up by simply looping over a neighborhood in all directions, retrieving the synthesized coordinates of these locations, and then looking up the exemplar colors. This forms the neighborhood of the pixel, p. Current anisometric approaches modify the neighbor access by taking into account the inverse Jacobian. This stretches out the accesses by rotating and scaling them, and has the number of drawbacks discussed above.

The anisometric texture synthesis method disclosed herein accesses only immediate neighbors of pixel, p, where the immediate neighbors are obtained by using a direction component. Thus, the method moves to one of the eight immediate neighbors of p, but only the closest one in the direction that has been selected. The method does not allow a jump to far away, non-local locations (non-local to the pixel, p). Having retrieved a synthesized coordinate at an immediate neighbor, an offset is applied to retrieve what the method predicts the synthesized coordinate should be at p itself. This offset is transformed by the Jacobian to account for the anisometric deformation.

Mathematically, the anisometric texture synthesis method defines a warped synthesized neighborhood as:

$$E[S[p+\phi(hat)]-J(p)\phi(hat)+\Delta] \qquad (1)$$

where:

$$\phi(hat)=\phi/\mathrm{norm}(\phi) \qquad (2).$$

and $\phi=J^{-1}(p)\Delta$

The immediate neighbors are given by the exemplar-space neighbor offset, which in equation (1) is $\Delta$. Moreover, $\phi$ is the synthesis-space inverse-Jacobian-transformed neighbor offset. Instead of using non-local pixels, the anisometric texture synthesis method looks at the direction of the vector, and normalizes the vector to a normalized distance of one. The method then determines which of the eight immediate neighbors in a 3×3 neighborhood has the direction that the method would like to examine. The term $S[p+\phi(hat)]$ in equation (1) is this neighbor, and the term $\phi(hat)$ is the direction component of the Jacobian-transformed neighbor location. This yields the location of which of the 8 neighbors to access.

Next, the synthesized texture is accessed at the immediate neighbor that is in the direction of where it is desirable to sample. The next term in equation (1) is $J(p)\phi(hat)$, which is the Jacobian at a pixel times the direction component of the Jacobian-transformed neighbor location. Subtracting this term from the synthesized texture coordinate retrieved from the immediate neighbor of p yields the predicted synthesized coordinate at p itself. Finally, the exemplar-space neighbor offset, $\Delta$, is added in equation (1) to predict the synthesized coordinate at the exemplar-space neighbor offset $\Delta$ of p.

The synthesized coordinates of an immediate neighbor, $S[p+\phi(hat)]$, are accessed. These are used to predict the synthesized coordinates at point, p, by subtracting $J(p)\phi(hat)$.

Then, having predicted the synthesized coordinates at p using that immediate neighbor, the exemplar-space offset delta, Δ, is added to that synthesized coordinate to predict the correct neighboring coordinate.

The delta, Δ, refers to neighborhood offsets. In some embodiments the neighborhood is a 5×5 neighborhood, while in other embodiments the neighborhood is a 3×3 neighborhood or even 4 diagonal points around the point, p. By way of example, for a 3×3 neighborhood, Δ=(−1,−1), (−1,0), (−1,1), (0,−1), (0,0), (0,1), (1,−1), (1,0), (1,1). As another example, a neighborhood consisting of 4 diagonal points would consist of neighbors Δ=(1,−1) (−1,1) (−1,−1) (1,1).

The anisometric texture synthesis method predict coordinates at p+Δ. A 4-pixel neighborhood is built for Δ=(1,−1) (−1,1) (−1,−1) (1,1). The key idea is that once a candidate is obtained for p in exemplar space, any offset delta, Δ, can be applied to have a candidate at another location in exemplar space. Thus, four candidates are obtained, one for each delta, Δ, in exemplar space.

In addition, the value of a certain number of pixels is averaged for each delta, Δ, in order to have a better prediction of the pixel appearance at p+Δ. This improves the quality of the neighborhood by averaging the contribution of the number of pixels for each delta, Δ. In some embodiments, the number of pixels is equal to three. In other embodiments, the number of pixels may be is equal to more or less than three pixels.

Anisometric Synthesis Upsampling Process

The upsampling process of the anisometric texture synthesis method also is modified by using the Jacobian field. This maintains texture coherence during coarse-to-fine synthesis by modifying each upsampling pass to account for the anisometry. Each child pixel inherits the parent synthesized coordinate, offset by the Jacobian times the relative child location. Mathematically, this concept is expressed by the equation:

$$S_l[p]:=S_{l-1}[p-\Delta]+J(p)\Delta, \Delta=(\pm\tfrac{1}{2}\pm\tfrac{1}{2})^T \qquad (3).$$

Equation (3) is saying that synthesis $S_l$ of p (or the synthesized coordinate of the child) is equal to the synthesized coordinate of the parent, where $S_{l-1}$ is the parent, plus the relative location of the child with respect to the parent (Δ) transformed by the Jacobian. Each coordinate of the 2D vector Δ is equal to +½ or −½, which means that there is a pyramid structure, such that each parent has two children. Thus, the relative location of each child relative to the parent is +½ or −½ on each coordinate.

Figure 6:
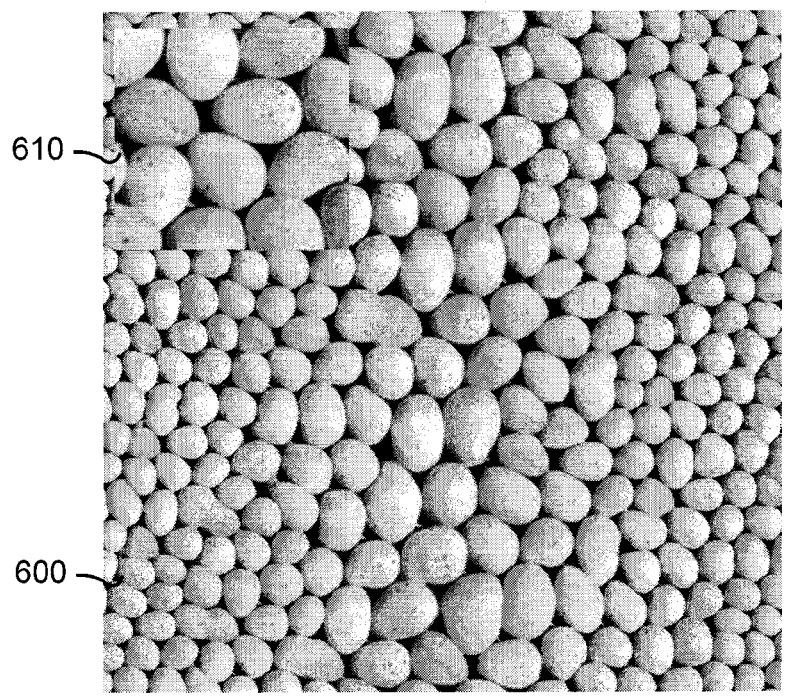
FIG. 6 illustrates an example of a first result of the anisometric texture synthesis process disclosed herein.

FIG. 6 illustrates an example of a first result of the anisometric texture synthesis process disclosed herein. In particular, an anisometric synthesized texture 600 is generated using the anisometric texture synthesis process and an exemplar 610. A nonuniform (non-constant) Jacobian field was specified across the anisometric synthesized texture 600. This can be seen by noting how the eggs become larger in the center of the anisometric synthesized texture 600 and smaller at the edges.

Figure 7:
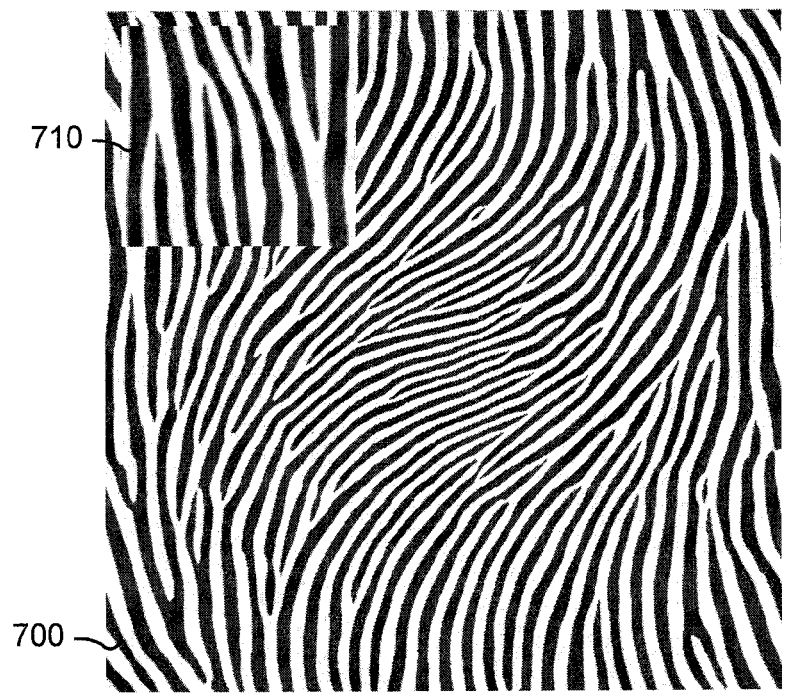
FIG. 7 illustrates an example of a second result of the anisometric texture synthesis process disclosed herein.

FIG. 7 illustrates an example of a second result of the anisometric texture synthesis process disclosed herein. An anisometric synthesized texture 700 is generated using the anisometric texture synthesis process and an exemplar 710. Once again, a non-constant Jacobian field was specified across the anisometric synthesized texture 700. This can be seen by noting how the zebra stripes are straight and nearly vertical in the exemplar 710 but are deformed and rotated within the anisometric synthesized texture 700.

Surface Texture Synthesis

One important application for anisometric texture synthesis is the generation of surface texture. This application will now be discussed, along with various improvements and refinements of the anisometric texture synthesis method that are specific to this application.

Figure 8:
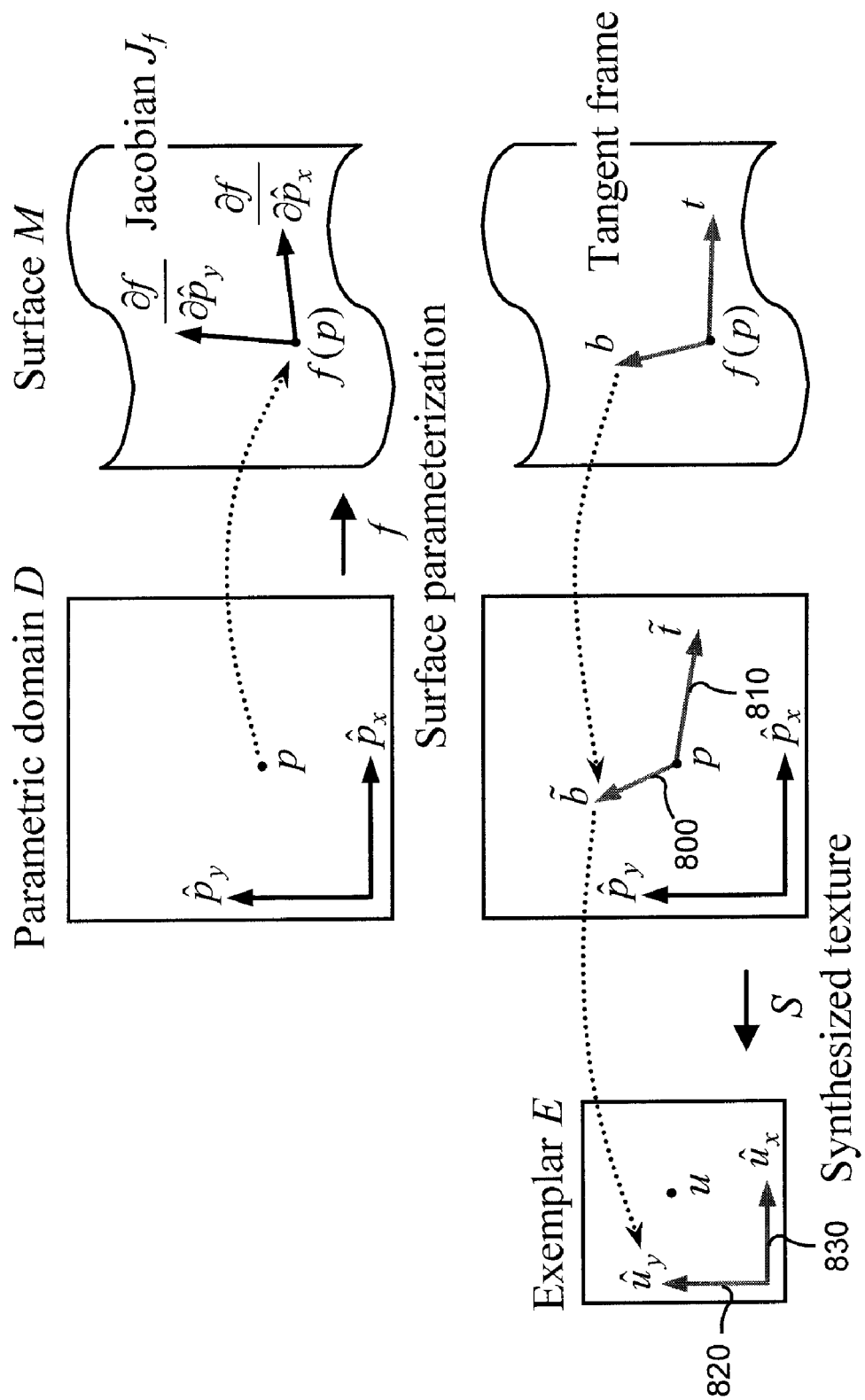
FIG. 8 illustrates the derivation of the Jacobian field for the surface texture application.

The Jacobian field specifies how to deform the synthesized texture. For the surface case, it is desirable to deform the texture in such a way that when the texture appears on the surface it looks correct. FIG. 8 illustrates the derivation of the Jacobian field for the surface texture application. In general, the surface is described by a parameterization. The surface M is parameterized over a parametric domain D, which means that there are coordinates on the surface that say how it should be flattened into 2-D. This is a process of texture mapping, and for every triangle on the surface, a portion of the image is retrieved from the texture domain. For every point on the surface, a Jacobian field of the parameterization can be determined. This is how the parametric domain gets mapped onto the surface. Because the surface geometry can be complicated, the surface is generally parameterized onto multiple charts as illustrated in 910. In other words, the surface is partitioned into charts, and each of these charts is mapped separately into the texture domain.

As can be seen from FIG. 8, another input that is needed is how the texture should be oriented. This can be user specified or done automatically. In the user specified case, the user is asked to paint the up direction on the surface using a user interface. As shown in FIG. 8, this amounts to specifying vectors t (the tangent vector) and b (the binormal vector) at each point on the surface. Various types of user interfaces may be used to accomplish this task.

The terms b(tilde) 800 and t(tilde) 810 shown in FIG. 8 are called the "pre-images" of the vectors t and b through the parameterization. The input is t and b (either user-specified or automatic), and b(tilde) 800 and t(tilde) 810 are the pre-images that specify what those vectors t and b map to in the parametric domain. The final Jacobian that is used during surface texture synthesis should be the Jacobian that maps b(tilde) 800 and t(tilde) 810 to the $\hat{u}_x$ 820 and $\hat{u}_y$ 830, the standard axes of the exemplar, E. Thus, given a surface, two vectors t and b are specified at each point using a user interface or automatically. Next, t and b are used to compute a Jacobian field in the synthesized image. This is used as the input to the anisometric texture synthesis method described above.

Mathematically, the goal is to synthesize texture anisometrically in the parametric domain such that the surface vectors t and b are locally identified with the standard axes $\hat{u}_x$ 820 and $\hat{u}_y$ 830 of the exemplar. Referring again to FIG. 8, it can be seen that $(t\ b)=J_f J^{-1} I$, where $J_f$ is the 3×2 Jacobian of the surface parameterization f:D→M, and J is the desired 2×2 Jacobian for the synthesized map S:D→E. Therefore, J is found using the equation:

$$J=(t\ b)^+ J_f = ((t\ b)^T (t\ b))^{-1} (t\ b)^T J_f \qquad (4),$$

where "+" denotes matrix pseudoinverse. If (t b) is orthonormal, then $(t\ b)^+ = (t\ b)^T$. The parameterization is piecewise linear, so $J_f$ is piecewise constant within each triangle. In contrast, the tangential frame (t b) varies per-pixel.

Figure 9:
FIG. 9 illustrates an example of a result using the anisometric texture synthesis method to perform surface texture synthesis.

FIG. 9 illustrates an example of a result using the anisometric texture synthesis method to perform surface texture synthesis. In particular, an exemplar 900 is used as the input to the anisometric texture synthesis, and an anisometric synthesized texture 910 is generated. Using the surface texture synthesis process described above, and the indireaction maps described below, an anisometric surface texture 920 is produced.

Indirection Maps

Current techniques typically synthesize texture over a surface by synthesizing colors at the vertices of an irregular mesh. Conversely, the anisometric texture synthesis method synthesizes texture directly in the parametric texture domain of a texture atlas parameterization. In order to form a seamless texture over a discontinuous atlas of parameterized charts for a surface texture, the synthesis neighborhoods for pixels near chart boundaries should include samples from other charts. Thus, the anisometric texture synthesis method uses indireaction pointers that provide the ability to jump from one atlas chart boundary to another texture atlas chart. Furthermore, the method includes an additional step of ensuring the charts are contiguous. This is achieved using an indireaction map.

For a small set of pixels outside the boundary of each chart, indireaction pointers are used to point to other pixels that are interior to another chart. There a little extra space (or gutter) around each chart, so that these indireaction pointers can be followed to retrieve the colors.

The indireaction pointers exploit the property that the anisometric correaction scheme accesses a neighborhood of fixed extent. Samples are read across charts using a per-level indireaction map I, by replacing each access S[p] with S[I[p]]. These indireaction maps depend only on the surface parameterization, and are precomputed by marching across chart boundaries. Space is reserved for the necessary 2-pixel band of indireaction pointers around each chart during atlas construction.

Figure 10:
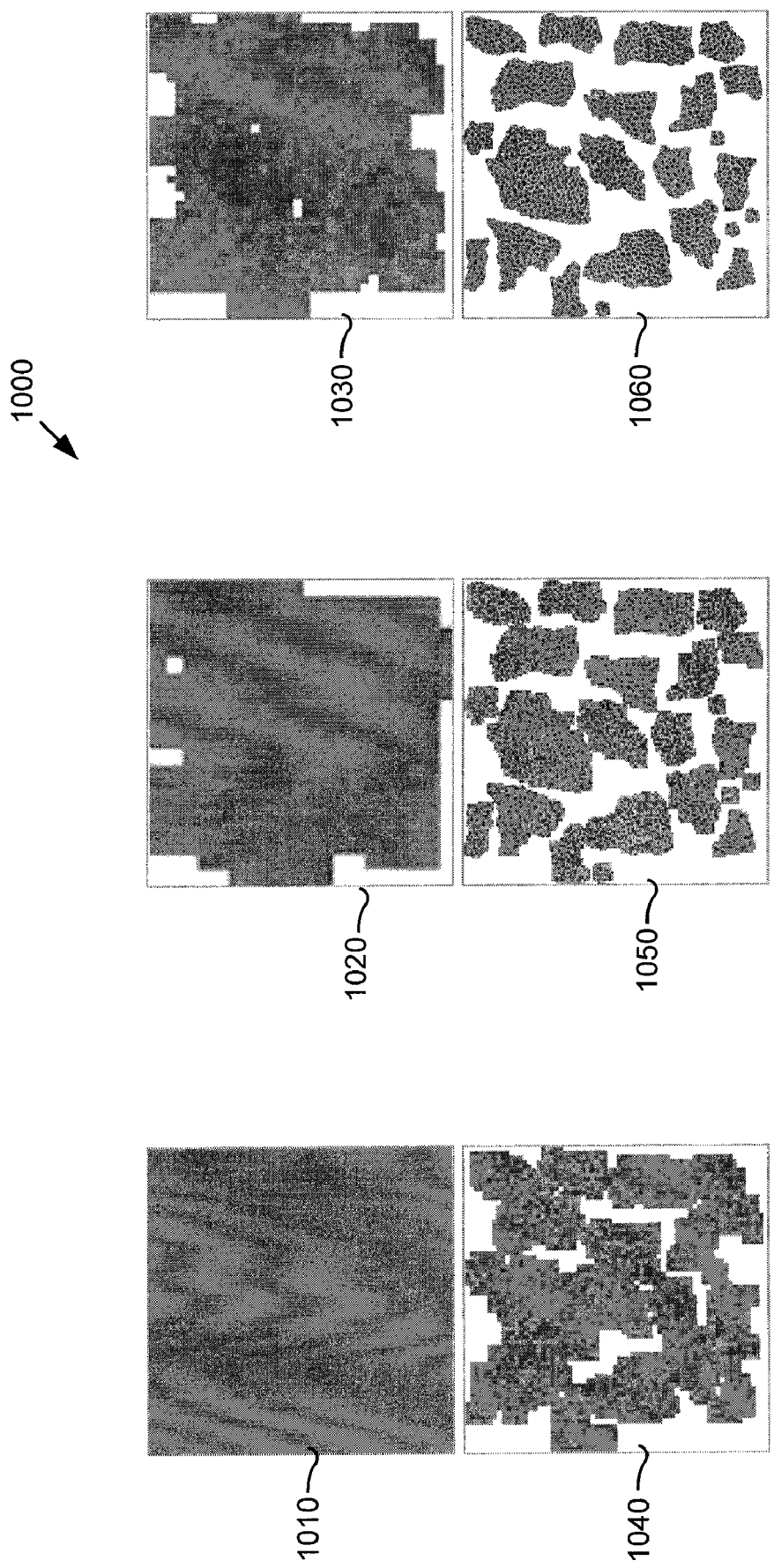
FIG. 10 is an illustration showing multiple levels of a multi-resolution synthesis pyramid.

FIG. 10 is an illustration of Levels 1-6 of a multi-resolution synthesis pyramid 1000, having a first level 1010, a second level 1020, a third level 1030, a fourth level 1040, a fifth level 1050, and a sixth level 1060. As shown in FIG. 10, because all resolution levels use the same atlas parameterization, extra gutter space is reserved at the finest levels of the pyramid for the indireaction pointers. In particular, as shown in FIG. 10, for levels 4-6 (1040, 1050, 1060) have increasing more gutter space around their images to accommodate the indireaction pointers.

Anisometric Synthesis Magnification

One difficulty in synthesizing texture within an atlas is that some parameterization distortion is usually inevitable and leads to undersampled regions. One way to hide this sampling nonuniformity is to use a synthesis magnification scheme. Synthesis magnification is using the synthesized coordinates to access a higher-resolution version of the same exemplar.

The main idea behind at least one current synthesis magnification scheme is to use the synthesized coordinates S to access a higher-resolution exemplar $E_H$. Specifically, the pixel value at a continuous coordinate p is obtained by combining the 4 nearest synthesized pixels as:

$$Mag_{E_H}(p) = \sum\nolimits_{\Delta = p - \lfloor p \rfloor - \delta, \delta \in \left\{ \binom{0}{0} \binom{1}{0} \binom{0}{1} \binom{1}{1} \right\}} w(\Delta) E_H[S[p-\Delta]+\Delta], \quad (5)$$

where $w(\Delta) = |\Delta_x| \cdot |\Delta_y|$ are bilinear interpolation weights. In surface texture synthesis, the aim is not necessarily to magnify to a higher-resolution exemplar $E_H$, but to recover detail missing in undersampled regions.

The anisometric texture synthesis method modifies the above synthesis magnification scheme to account for anisometry. In other words, the Jacobian is included and used to modify the magnification step of the above synthesis magnification scheme. This is achieved by accessing the Jacobian map as given by the equation:

$$Mag_{E_H}(p) = \Sigma_{\Delta = p - \lfloor p \rfloor - \delta, \ \delta \in \ldots} w(\Delta) E_H[S[p-\Delta]+J(p-\Delta)\Delta] \quad (6).$$

Anisometric synthesis magnification can be performed in the surface shader at rendering time, thereby adding little cost.

FIG. 11 illustrates an example of the anisometric synthesis magnification. A shown in FIG. 11, the textured surface is in the form of a horse 1100. Using synthesis magnification that includes the Jacobian information, a portion 1110 of the textured surface 1100 is magnified. The middle image 1120 is the portion 1110 shown without synthesis magnification. The right image 1130 is the portion 1110 with synthesis magnification.

IV. Exemplary Operating Environment

The anisometric texture synthesis system and method is designed to operate in a computing environment. The following discussion is intended to provide a brief, general description of a suitable computing environment in which the anisometric texture synthesis system and method may be implemented.

Figure 12:
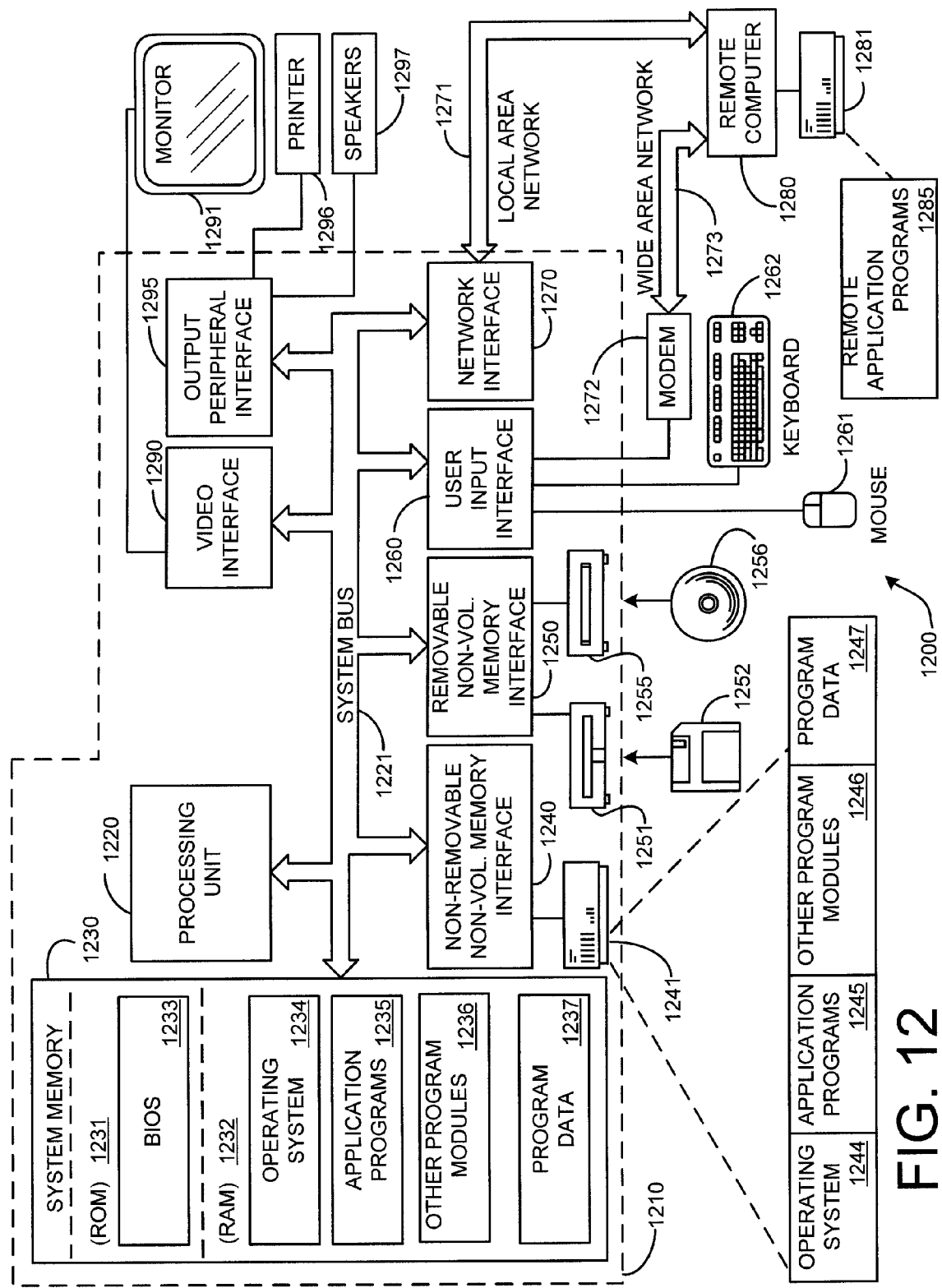
FIG. 12 illustrates an example of a suitable computing system environment in which the anisometric texture synthesis system and method may be implemented.

FIG. 12 illustrates an example of a suitable computing system environment in which the anisometric texture synthesis system and method may be implemented. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment.

The anisometric texture synthesis system and method is operational with numerous other general purpose or special purpose computing system environments or configurations. Examples of well known computing systems, environments, and/or configurations that may be suitable for use with the anisometric texture synthesis system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The anisometric texture synthesis system and method may be described in the general context of computer-executable instructions, such as program modules, being executed by a computer. Generally, program modules include routines, programs, objects, components, data structures, etc., that perform particular tasks or implement particular abstract data types. The anisometric texture synthesis system and method may also be practiced in distributed computing environments where tasks are performed by remote processing devices that are linked through a communications network. In a distributed computing environment, program modules may be located in both local and remote computer storage media including memory storage devices. With reference to FIG. 12, an exemplary system for the anisometric texture synthesis system and method includes a general-purpose computing device in the form of a computer 1210.

Components of the computer 1210 may include, but are not limited to, a processing unit 1220 (such as a central processing unit, CPU), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1210 typically includes a variety of computer readable media. Computer readable media can be any available media that can be accessed by the computer 1210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within the computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1220 through a user input interface 1260 that is coupled to the system bus 1221, but may be connected by other interface and bus structures, such as, for example, a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on a memory device 1281. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for synthesizing anisometric texture comprising:
    using a general-purpose computing device having a processor to perform the following:
        inputting a Jacobian field at a pixel and a synthesized pixel coordinate image at a previous resolution level;
        selecting a direction to examine;
        defining a synthesis-space inverse-Jacobian-transformed neighbor offset vector using an exemplar-space neighbor offset and an inverse Jacobian at the pixel;
        normalizing the synthesis-space inverse-Jacobian-transformed neighbor offset vector to have a length of one;
        determining which of eight immediate neighbors of the pixel to access based on the normalized synthesis-space inverse-Jacobian-transformed neighbor offset vector;
        accessing one of the eight immediate pixel neighbors that is closest in the selected direction to the pixel being processed from the synthesized pixel coordinate image at the previous resolution level, where the synthesized pixel coordinate image does not directly contain pixel colors but instead contains pixel coordinates where the pixel colors are fetched in an exemplar texture; and
        warping pixel coordinates of the immediate pixel neighbors using the Jacobian field at the pixel to form an anisometrically warped synthesized texture neighborhood that is used to synthesize the anisometric texture.

2. The method of claim 1, further comprising selecting at least one candidate pixel from the exemplar texture using the anisometrically warped synthesized texture neighborhood.

3. The method of claim 2, wherein selecting at least one candidate pixel further comprises using a correction technique.

4. The method of claim 3, wherein the correction technique is a per-pixel neighborhood-matching correction technique.

5. The method of claim 1, wherein the anisometrically synthesized texture is on a surface and further comprising aligning the anisometrically synthesized texture with the Jacobian field over the surface.

6. The method of claim 5, further comprising:
    synthesizing the anisometrically synthesized texture directly in a parametric texture domain of a texture atlas parameterization having a plurality of texture atlas charts; and,
    using indirection pointers that provide an ability to jump between the plurality of texture atlas charts.

7. The method of claim 6, further comprising:
    selecting a set of pixels near a chart boundary in one of the charts;
    using the indirection pointers to point to other pixels that are interior to another one of the charts.

8. The method of claim 1, further comprising using the Jacobian field and a synthesis magnification technique to enhance the anisometrically synthesized texture to produce a magnified, high-resolution anisometrically synthesized texture.

9. The method of claim 8, further comprising performing the synthesis magnification technique in a surface shader at rendering time.

10. A computer-readable storage medium having stored and encoded thereon computer-executable instructions for synthesizing texture on a surface using an exemplar, comprising:
    specifying a Jacobian field at a pixel;
    selecting a direction to examine based on a direction component;
    defining a synthesis-space inverse-Jacobian-transformed neighbor offset vector using an exemplar-space neighbor offset and an inverse Jacobian at the pixel;
    normalizing the synthesis-space inverse-Jacobian-transformed neighbor offset vector to have a length of one;
    determining which of eight immediate neighbors of the pixel to access based on the normalized synthesis-space inverse-Jacobian-transformed neighbor offset vector;
    accessing one of the eight immediate pixel neighbors that is closest in the selected direction to the pixel being processed, where the synthesized pixel coordinate image does not directly contain pixel colors but instead contains pixel coordinates where the pixel colors are fetched in an exemplar texture;
    warping upsampled pixel coordinates of the pixel and its immediate pixel neighbors using the Jacobian field;
    correcting the warped, upsampled pixel coordinates using the Jacobian field to allow rotation and scaling of the coordinates of the pixel and neighboring pixels; and
    parameterizing the surface over a parametric domain by mapping the parametric domain onto the surface.

11. The computer-readable storage medium of claim 10, further comprising receiving input about how the texture should be oriented on the surface, the input including at least one of: (a) a tangent vector at each point on the surface; (b) a binormal vector at each point on the surface.

12. The computer-readable storage medium of claim 11, further comprising locally identifying the tangent vector and the binormal vector with standard axes of an exemplar.

13. The computer-readable storage medium of claim 10, further comprising using indirection pointers to form a seamless texture over the surface from a discontinuous texture atlas of parameterized charts.

14. The computer-readable storage medium of claim 13, further comprising:
    forming a gutter of extra space around each of the texture atlas charts; and
    using the indirection pointers at the gutter to point to other pixels that are interior to another chart.

15. The computer-readable storage medium of claim 14, further comprising using a synthesis magnification technique that is modified by the Jacobian field to obtain a higher-resolution version of the exemplar.

16. A computer-implemented process for synthesizing anisometric synthesized texture from an exemplar, comprising:
    using the computer having a processor to perform the following:
        inputting a Jacobian field $J(p)$ at a pixel $(p)$ and an initialization image at a previous resolution level;

upsampling pixel coordinates at the previous resolution level to generate a current resolution level having a finer resolution than the previous resolution level;

defining $\phi$ as a synthesis-space inverse-Jacobian-transformed neighbor offset vector, where $\phi=J^{-1}(p)\Delta$ and where $\Delta$ is an exemplar-space neighbor offset and $J^{-1}(p)$ is an inverse Jacobian at pixel (p);

normalizing the synthesis-space inverse-Jacobian-transformed neighbor offset vector to have a length of one;

determining which one of the eight immediate neighbors of the pixel forming a pixel neighborhood to access based on the normalized synthesis-space inverse-Jacobian-transformed neighbor offset vector;

accessing one of the eight immediate pixel neighbors of the pixel that is closest in a selected direction to the pixel being processed;

warping the upsampled pixel coordinates of the pixel neighborhood using the Jacobian field; and using the exemplar and the warped upsampled pixel coordinates to obtain the anisometric synthesized texture.

17. The computer-implemented process of claim 16, further comprising correcting the warped upsampled pixel coordinates using the Jacobian field to allo rotation and scaling of coordinates of the pixel and neighboring pixels.

18. The computer-implemented process of claim 17, further comprising:
  parameterizing a surface over a parametric domain; and
  determining a Jacobian field of the parametric domain for every point on the surface to map the parametric domain to the surface.

19. The computer-implemented process of claim 18, further comprising using an indirection map to form a seamless anisometric synthesized texture over the surface.

20. The computer-implemented process of claim 19, further comprising modifying a synthesis magnification technique using the Jacobian field to account for anisometry in the anisometric synthesized texture such that a higher-resolution version of the exemplar is obtained.

* * * * *

UNITED STATES PATENT AND TRADEMARK OFFICE
CERTIFICATE OF CORRECTION

| | | |
|---|---|---|
| PATENT NO. | : 7,733,350 B2 | |
| APPLICATION NO. | : 11/428311 | |
| DATED | : June 8, 2010 | |
| INVENTOR(S) | : Sylvain Lefebvre et al. | |

It is certified that error appears in the above-identified patent and that said Letters Patent is hereby corrected as shown below:

In column 18, line 3, in Claim 17, delete "allo" and insert -- allow --, therefor.

Signed and Sealed this
Seventeenth Day of May, 2011

David J. Kappos
*Director of the United States Patent and Trademark Office*